United States Patent [19]
Archer

[11] 3,720,434
[45] March 13, 1973

[54] CARGO SLING

[75] Inventor: Jean-Francois Archer, La Celle Saint-Cloud, France

[73] Assignee: Societe Technique d'Acessoires Speciales, Asnieres (Hauts de Seine), France

[22] Filed: Feb. 2, 1971

[21] Appl. No.: 111,846

[30] Foreign Application Priority Data

Feb. 3, 1970 France...................................703639
April 23, 1970 France................................7014726

[52] U.S. Cl...............................294/74, 24/265 EC
[51] Int. Cl................................................B66c 1/18
[58] Field of Search............................294/74–77, 78, 294/82–84; 24/121, 122.3, 133, 33 RB, 31 B, 36, 265 EC, 265.3

[56] References Cited

UNITED STATES PATENTS 2,999,284  9/1961  McComb..............................24/33 B
3,581,350  6/1971  McComb..............................24/33 B Primary Examiner—Evon C. Blunk
Assistant Examiner—Johnny D. Cherry
Attorney—Karl F. Ross

[57] ABSTRACT

A strap for a cargo sling has an extremity sandwiched between at least one pair of perforated anchor plates traversed by staples whose shanks pass through their perforations with a clearance decreasing progressively toward the free end of a coupling member fixedly or hingedly secured to the anchor plates. The strap is reinforced by auxiliary clips upon which the staple shanks come to bear under load.

7 Claims, 8 Drawing Figures

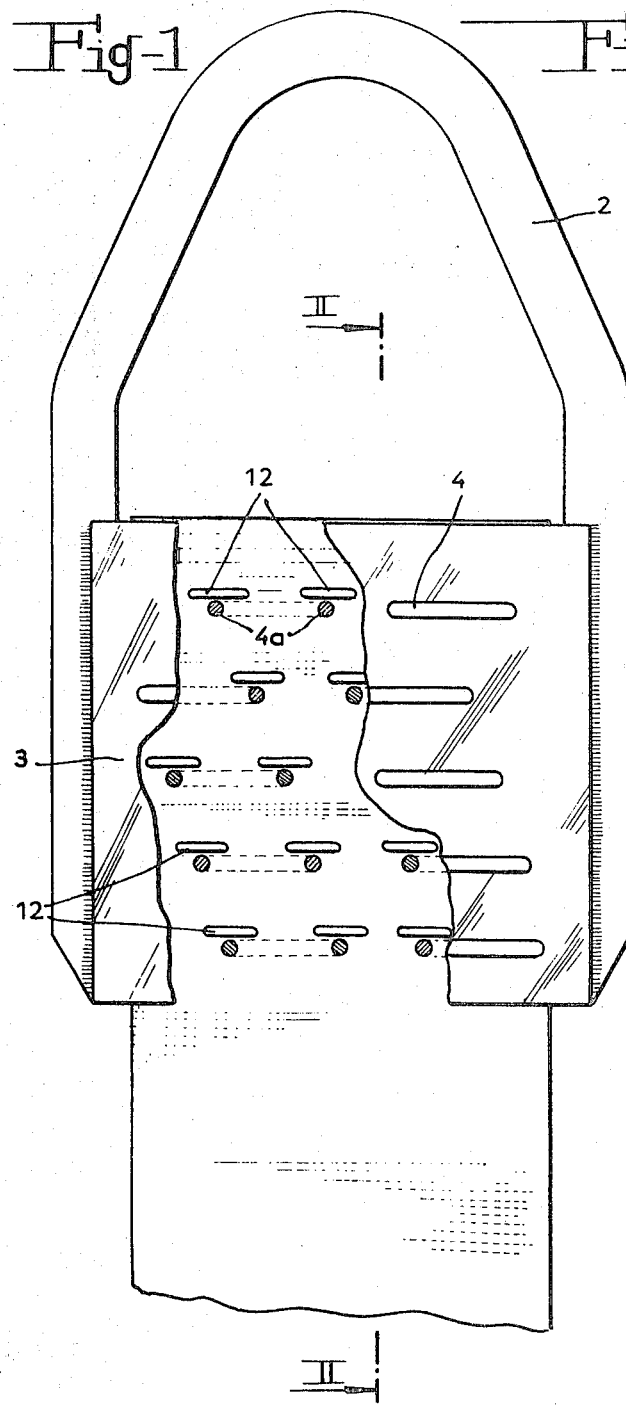
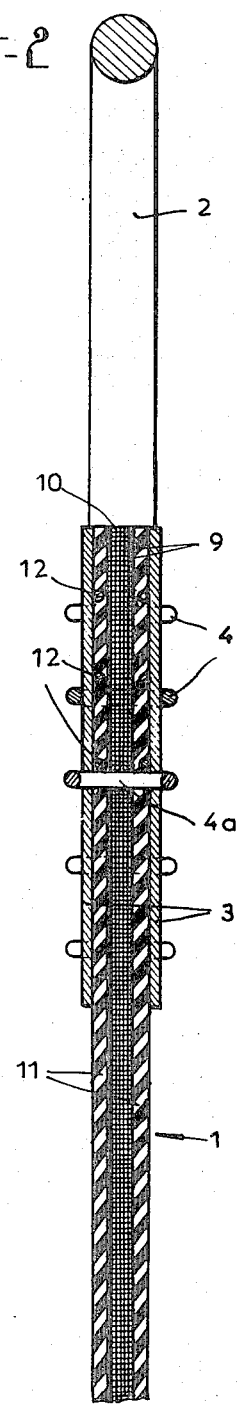

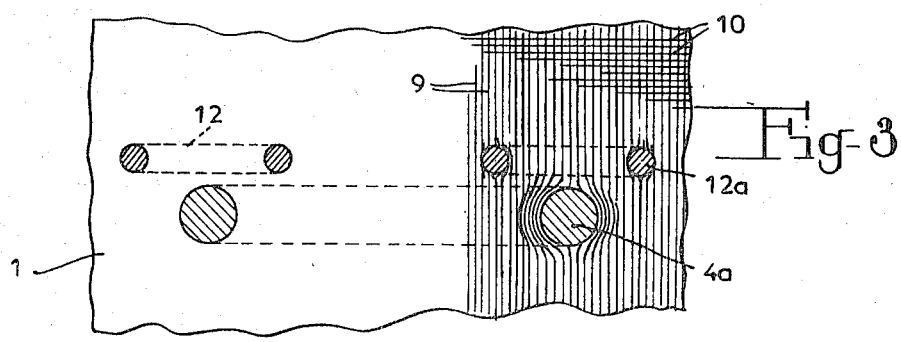
Fig-3
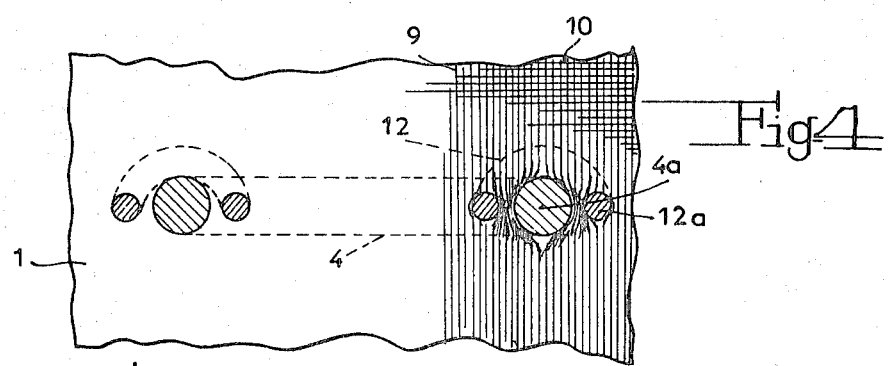
Fig-4
Fig-6
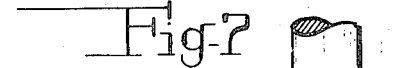
Fig-7
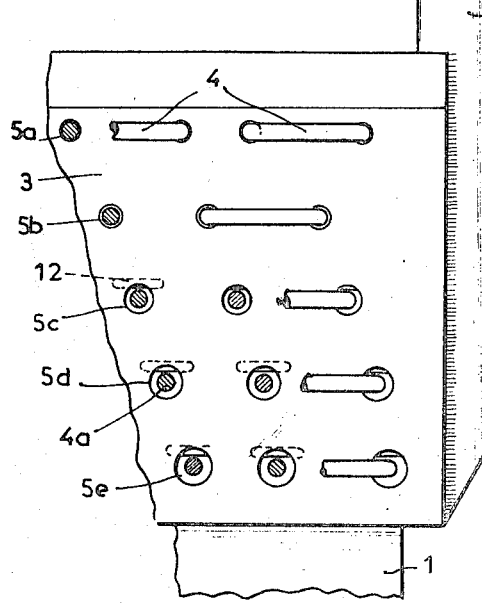
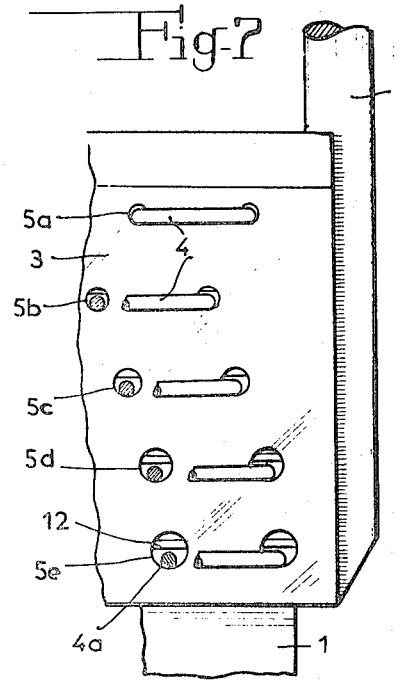
Jean-François ARCHER
INVENTOR
BY Karl F. Ross
Attorney

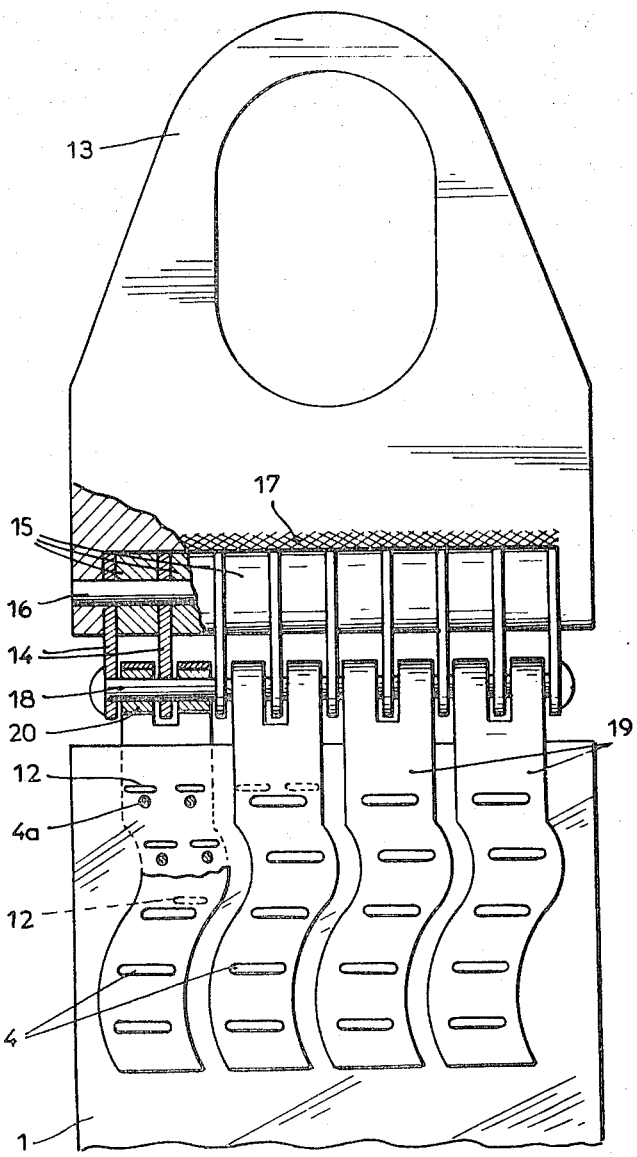

CARGO SLING

The present invention relates to cargo slings of the type in which a strap is provided at least at one of its ends with a coupling element connected to two parallel elements such as anchor plates between which the end section of the strap is secured by clamps or clips.

Even if the strap is of very good quality and has a complex construction, there is some danger that the traction exerted upon transverse threads of the strap by the clamps or clips may be sufficient to displace said threads and even to break them, in spite of the presence of external layers of elastomeric material so that the strap slides in relation to the plates, tearing the strap along longitudinal lines. This is particularly the case where a simple strap is used, for example a textile core provided with a layer of elastomeric material on each face.

One object of the present invention is to provide an improved sling of the above-mentioned type, in which any risk of strap rupture is substantially reduced.

I realize the aforestated object by the provision of clamping members such as staples whose shanks pass through perforations of the anchor elements and through the strap extremity sandwiched therebetween. According to a feature of my invention, these shanks pass through the perforations of the anchor elements with clearance or play decreasing progressively in the direction in which tension is exerted upon the strap extremity under load, i.e. toward the free end of the coupling element which may be fixedly or hingedly connected with the anchor elements. Pursuant to another feature of my invention, the strap extremity is reinforced by auxiliary clips which are movable therewith, relatively to the anchor elements and the clamping means engaging same, and which are disposed next to the staple shanks on the side thereof facing in the tensioning direction.

Advantageously, the clips are deformable so that, if the strap moves a little in relation to the anchor elements, each auxiliary clip engages the associated portion of its respective clamping member and bends around it so that any longitudinal threads between the clamping member and its adjoining clip are gripped therebetween to lock the strap against further movement.

The perforations of the anchor elements are preferably a plurality of rows of holes whose diameter increases from the row nearest the coupling element to the row farthest therefrom, so that when the strap is not in use there is a certain play between the edges of the holes and the staple shanks; when the strap is subject to tension, the part of its extremity located between the anchor elements can elongate until all the clamping members are in contact with the edges of their respective holes. The pull is thus uniformly distributed among all the clamping members, so that the risk of tearing is further reduced. The best arrangement is that in which the difference between the radii of the holes, from one row to another, is equal to the elongation exhibited by that portion of the strap which is included between those two rows when under maximum load.

The above and other features of my invention will now be described with reference to the accompanying drawing, in which:

FIG. 1 is a plan view of one end of one exemplary embodiment, with part of one anchor plate removed;

FIG. 2 is a cross-section on the line II—II of FIG. 1;

FIG. 3 is a detailed sectional view on a larger scale, showing part of the strap in an unstressed condition;

FIG. 4 is a detailed sectional view similar to FIG. 3 showing the deformation of the auxiliary clips when the strap is loaded sufficiently to slide in relation to the coupling element;

FIG. 5 is a detail view of one modified embodiment;

FIG. 6 is a partial plan view of another exemplary embodiment, showing the relationship of the parts with the strap unstressed;

FIG. 7 is a partial plan view similar to FIG. 6, showing the same sling in the stressed state; and FIG. 8 is a plan view of yet another exemplary embodiment of the invention.

In the embodiments shown in the drawing, a strap 1 consisting of a textile core comprising longitudinal threads 9 and transverse threads 10 is covered by a layer of elastomeric material 11 on each of its surfaces (see FIG. 2). A coupling element 2 is attached to one end of the strap 1, this element being in the form of a U-shaped link whose arms are joined to one another by two parallel elements in the form of anchor plates 3 which are separated from one another by a distance substantially equal to the thickness of the strap 1. The end portion of the strap 1 is sandwiched between the two plates 3 and secured by clamping members or staples 4 which pass through holes provided in the plates for this purpose, so that their shanks 4a penetrate the strap 1. The clamping members are arranged in a tranversely staggered manner so that there are no two shanks 4a on the same longitudinal line of the strap.

Auxiliary clips 12, attached to the strap prior to its insertion between the plates 3, come to lie next to the locations of the shanks 4a of the clamping members 4, in such manner that each clip 12 is located on the side of its associated shank 4a facing nearest the free end of the link 2, as shown in FIGS. 1–3.

If the strap 1 moves in relation to the plates 3, under the effect of a load to which the sling is subjected, the clips 12 engage the associated shanks 4a of the clamping members 4 and wrap themselves partly around them, as shown in FIG. 4. The longitudinal threads 9 which are located on either side of a shank 4a, having been separated by the insertion of this shank, are thus squeezed between the staple shank 4a and the shanks 12a of the respective clip 12 (FIG. 4). The strap is thus locked firmly in position and cannot move in relation to the plates.

Each of the clips 12 can be arranged opposite a shank 4a so that the centerline of the clip 12 is substantially aligned with the axis of the associated shank 4a, as shown in FIGS. 1, 3 and 4. A modified arrangement is shown in FIG. 5, in which the centerline of each clip 12 substantially registers with that of the associated clamping member 4, the width of the clip 12 being greater than that of the clamping member 4.

In any practical embodiment the clamping members 4 will be arranged in several rows, and in the exemplary embodiment shown in FIG. 6 the diameters of the holes 5a, 5b, 5c, 5d, 5e, provided in the plates 3 to accommodate the shanks 4a of the clamping members 4, increase row by row from the row which is nearest to the free end of the link 2 to the row which is farthest from that end.

Thus there is a certain play between the edges of the holes and the shanks of the clamping members when the strap is not subjected to a load, as shown in FIG. 6. Preferably the difference in radium between the holes of two rows, for example the holes 5c and 5d, is equal to the elongation to which the portion of the strap 1 included between those two rows is subjected when the strap is subjected to a predetermined maximum stress.

Under these conditions, when the strap is taut, its extremity bracketed by the two plates 3 can elongate until each shank 4a comes into contact with the edge of the hole in which it is engaged, as shown in FIG. 7. The pull is thus uniformly distributed among all the clamping members and is not exclusively borne by those clamping members which are engaged in the holes 5e, as would be the case if all the holes provided in the plates 3 had the same radius.

FIG. 8 shows an exemplary embodiment of the invention in which a coupling element 13 comprises a recess receiving a group of small perforated hinge plates 14, separated from one another by rollers 15 and maintained in position by a connecting rod 16 and a welding seam 17.

The hinge plates 14 are coupled by a rod 18 to a plurality of U-shaped fasteners 19 with flat perforated legs traversed by staples 4, each fastener embracing a respective pair of rollers 20 carried by the rod 18. The end of the strap 1 is inserted between the parallel legs of the fasteners 19 and is stapled in the manner described above, with the aid of auxiliary clips 12 provided on the strap. The diameter of the holes accommodating the shanks 4a of the clamping members or staples 4 increases from row to row, as described with reference to FIGS. 6 and 7.

The invention is not limited to the embodiments which have been described and illustrated but covers various modifications thereof.

What I claim as my invention and desire to secure by letters patent of the United States is:

1. A strap for a cargo sling having an extremity provided with at least one pair of anchor elements formed with longitudinally spaced transverse rows of holes bracketing said extremity, coupling means secured to said anchor elements for enabling the exertion of longitudinal tension upon a free end of said extremity under load, and clamping means connecting said elements with said extremity; said clamping means having shanks which traverse said extremity and which pass through said holes with play increasing progressively from the row closest to said free end to the row farthest therefrom, said holes progressively increasing in diameter from said closest to said farthest row.

2. A strap as defined in claim 1 wherein said extremity is extensible under load to a predetermined maximum elongation, the difference between the hole radii of any two rows substantially corresponding to the maximum elongation of the intervening strap portion.

3. A strap for a cargo sling having an extremity provided with at least one pair of perforated anchor elements bracketing said extremity, coupling means secured to said anchor elements for enabling the exertion of longitudinal tension upon a free end of said extremity under load, clamping means connecting said elements with said extremity, said clamping means having shanks which traverse said extremity and the perforations of said anchor elements, and deformable clips on said extremity disposed next to said shanks on the side thereof proximal said free end, said clips lying between said anchor elements and being movable relatively thereto under load.

4. A strap as defined in claim 3 wherein said clips are positioned symmetrically with reference to the adjoining shanks and are sufficiently flexible to wrap themselves partly about said shanks upon relative motion under load.

5. A strap for a cargo sling having an extremity of textile material with longitudinal warp threads intersected by weft threads, said extremity being provided with at least one pair of anchor elements formed with longitudinally spaced perforations bracketing said extremity; coupling means secured to said anchor elements for enabling the exertion of longitudinal tension upon a free end of said extremity under load; clamping means having shanks which traverse said extremity and which pass through said perforations with play increasing progressively from the row closest to said free end to the row farthest therefrom; and reinforcements on said extremity movable therewith relatively to said clamping means, said reinforcements being disposed next to said shanks on the side thereof proximal said free end; said reinforcements, upon exertion of said longitudinal tension, pinching said longitudinal warp threads between said reinforcements and said clamping means, thus limiting relative movement of said extremity and said anchor elements.

6. A strap as defined in claim 5 wherein the perforations of successive rows are transversely staggered.

7. A strap as defined in claim 5 wherein said reinforcements are clips of sufficient flexibility to wrap themselves partly about an adjoining shank upon relative motion under load.

* * * * *